US012807238B2

(12) United States Patent
Velasco et al.

(10) Patent No.: US 12,807,238 B2
(45) Date of Patent: Nov. 24, 2026

(54) SYSTEMS AND METHODS TO ADJUST HEIGHT OF VEHICLE TAILGATES

(71) Applicant: TOYOTA MOTOR ENGINEERING &MANUFACTURING NORTH AMERICA, INC., Plano, TX (US)

(72) Inventors: Juan A. Velasco, Ypsilanti, MI (US); Andrew M. Olive, Saline, MI (US); Jason Cremer, Stockbridge, MI (US); Takehito Yoda, Novi, MI (US); Taesoo Kim, Ann Arbor, MI (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/805,256

(22) Filed: Aug. 14, 2024

(65) Prior Publication Data

US 2026/0048796 A1 Feb. 19, 2026

(51) Int. Cl.

| | |
|---|---|
| ***B62D 33/027*** | (2006.01) |
| ***E05F 15/53*** | (2015.01) |
| ***E05F 15/70*** | (2015.01) |

(52) U.S. Cl.

CPC ..... *B62D 33/0276* (2013.01); *B62D 33/0273* (2013.01); *E05F 15/53* (2015.01); *E05F 15/70* (2015.01)

(58) Field of Classification Search

CPC ............ B62D 33/0276; B62D 33/0273; B60K 2001/0416; E05F 15/70; E05F 15/53

See application file for complete search history.

(56) References Cited

U.S. PATENT DOCUMENTS

| | | | | |
|---|---|---|---|---|
| 2,706,565 | A | 4/1955 | Krasno | |
| 3,887,092 | A * | 6/1975 | Leet | B60P 1/4421 414/545 |
| 5,732,995 | A | 3/1998 | Piccariello | |
| 6,976,820 | B2 | 12/2005 | Sandy | |
| 7,111,884 | B2 | 9/2006 | Johnson | |
| 7,322,627 | B1 | 1/2008 | Nicholson | |
| 7,422,262 | B2 | 9/2008 | Marshall | |
| 9,090,199 | B2 * | 7/2015 | Gunby | B60P 1/433 |
| 9,718,415 | B2 * | 8/2017 | Squicciarini | B60R 5/04 |
| 10,494,037 | B2 * | 12/2019 | Williams | B60P 7/08 |
| 10,661,843 | B1 | 5/2020 | Nieves | |
| 11,975,647 | B2 * | 5/2024 | Diephuis | B60P 1/003 |
| 12,015,263 | B2 * | 6/2024 | Schalyo | E05F 15/40 |

(Continued)

FOREIGN PATENT DOCUMENTS

| | | | |
|---|---|---|---|
| EP | 0541421 | A1 | 5/1993 |
| FR | 2810932 | A1 | 1/2002 |

*Primary Examiner* — Daniel J Troy
*Assistant Examiner* — Susan M. Heschel
(74) *Attorney, Agent, or Firm* — HAYNES AND BOONE, LLP

(57) ABSTRACT

The height of a vehicle tailgate may be adjusted. A vehicle is provided including a bed for transporting cargo. A tailgate member provides access to the truck bed. An actuation mechanism couples the tailgate member to the bed and is operable to pivot the tailgate member between a vertical, closed position and a horizontal, open position. The actuation mechanism is also operable to adjust the height of the tailgate member relative to the truck bed.

10 Claims, 6 Drawing Sheets

(56) References Cited

U.S. PATENT DOCUMENTS

| | | | | |
|---|---|---|---|---|
| 12,227,242 | B2 * | 2/2025 | Woods | B62D 63/064 |
| 2007/0158968 | A1 * | 7/2007 | Chandler | B60P 3/14 |
| | | | | 296/37.6 |
| 2011/0025117 | A1 | 2/2011 | Williams, III | |
| 2016/0257238 | A1 | 9/2016 | Ban | |
| 2017/0291551 | A1 | 10/2017 | Krajenke | |

* cited by examiner

SYSTEMS AND METHODS TO ADJUST HEIGHT OF VEHICLE TAILGATES

TECHNICAL FIELD

The subject matter described herein relates generally to vehicle tailgates and, more particularly, to systems and methods for adjusting the height of tailgates.

BACKGROUND

Some electric vehicles have cargo areas that include a tailgate. Although the tailgates can pivot to open and close, sometimes further manipulation of the tailgate is necessary. However, there is currently no conventional solution to meet this need.

SUMMARY

Accordingly, to overcome the limitations of the conventional art, the present disclosure provides a tailgate that is height adjustable and automatic. At the push of a button, for example, the tailgate may be opened or lifted/lowered for accessory drawer use and/or to aid in loading/unloading large objects.

The various embodiments described herein provide a solution to adjust the height of a vehicle tailgate. A general embodiment of the present disclosure provides a vehicle including a bed for transporting cargo, such as, for example, a pickup truck. A tailgate member provides access to the truck bed. An actuation mechanism couples the tailgate member to the bed and is operable to pivot the tailgate member between a vertical, closed position and a horizontal, open position. The actuation mechanism is also operable to adjust the height of the tailgate member relative to the truck bed.

Another generalized embodiment of the present disclosure provides a height-adjustable tailgate for vehicles such as, for example, a pickup truck having a tailgate member providing access to a truck bed. An actuation mechanism couples the tailgate member to the truck bed for transporting cargo. The actuation mechanism is operable to pivot the tailgate member between a vertical, closed position and a horizontal, open position. The actuation mechanism is further operable to adjust the height of the tailgate member relative to the truck bed.

In yet another generalized embodiment, a computer-implemented method for adjusting a height of a vehicle tailgate is provided. An activation signal is first received by processing circuitry communicably coupled to an actuation mechanism of the tailgate member. As previously mentioned, the actuation mechanism couples the tailgate member to the bed of the vehicle for transporting cargo. In response to the activation signal, the height of the tailgate member relative to the bed is adjusted.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
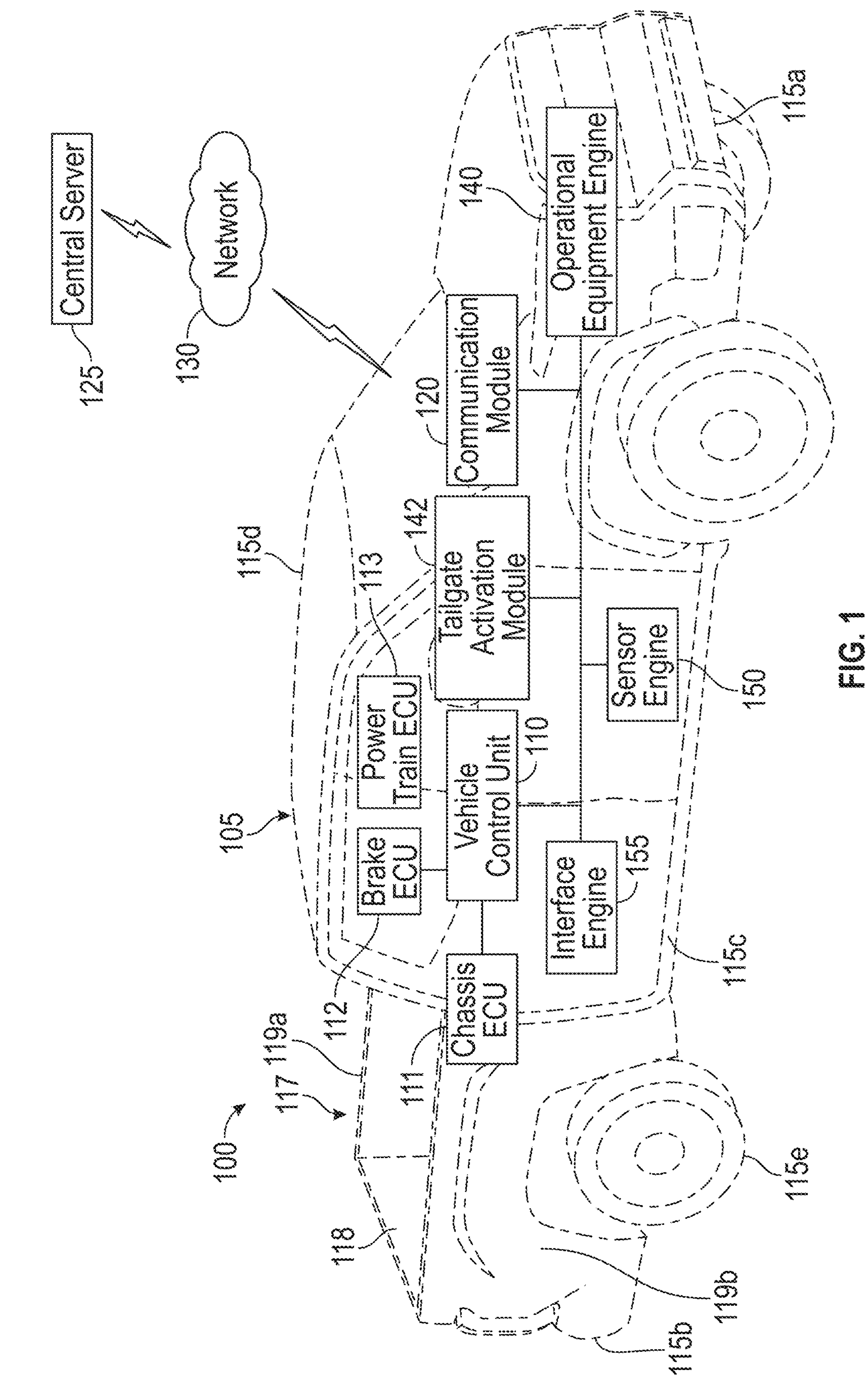
FIG. 1 is a diagrammatic illustration of a vehicle tailgate adjustment system in accordance with at least one embodiment of the present disclosure.

The present disclosure is generally directed to systems and methods to adjust the height of a vehicle tailgate up or down. For example, pickup trucks are vehicles that include a bed for cargo transport. The truck bed deck is accessible via a tailgate member that pivots from a vertical, closed position to a horizontal, open position. The tailgate member is also operable to adjust its height up or down relative to the truck bed deck.

The ability to adjust the height of the tailgate member provides a number of advantages. For example, an electric truck with a battery back under the bed deck creates a bump that will lift the deck about 4-6 inches vs. conventional bed decks. An accessory storage compartment (e.g., drawers) behind the battery bump may be added to thereby create a flat deck surface and extra storage. However, a tailgate member with hinges at the bottom of the deck may allow the use of the accessory storage, but will be too low to help load long objects into the deck (e.g., 4×8 plywood or wood 2×4s) since the bump is present.

Accordingly, embodiments of the present disclosure provides height-adjustable tailgates, which may be adjusted automatically or manually. As described herein, the tailgate member hinges, via an actuation mechanism, from a closed position to an open position to allow access to the deck's accessory drawers. In certain embodiments, at the receipt of an activation signal (e.g., in response to the push of a button), the tailgate member can be raised or lowered to be level with the bed deck floor, thus creating a flat surface across the truck bed, to aid in loading large objects.

The vehicle tailgate adjustment system described herein may be implemented as a process at least partially implemented on a display, and operated by a control process executing on a processor that accepts user inputs from a suitable user-interface and other control devices, and that is in communication with one or more tailgate actuation mechanisms. In that regard, the control process performs certain specific operations in response to different inputs or selections made at different times, and/or in response to real-time or near-real-time user inputs.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes, and should not be considered to limit the scope of the vehicle door activation system described herein. Certain features may be added, removed, or modified without departing from the spirit of the claimed subject matter.

FIG. 1 is a diagrammatic illustration of a vehicle tailgate adjustment system in accordance with at least one embodiment of the present disclosure. In an example, a vehicle tailgate adjustment system is referred to by the reference numeral 100 and includes a vehicle 105, such as a pickup truck, and a vehicle control unit 110 located on the vehicle 105. The vehicle 105 may include a front portion 115*a* (including a front bumper), a rear portion 115*b* (including a rear bumper), a right side portion 115*c* (including a right front quarter panel, a right front door, a right rear door, and a right rear quarter panel), a left side portion 115*d* (including a left front quarter panel, a left front door, a left rear door, and a left rear quarter panel), and wheels 115*e*. More specifically, the rear portion 115*b* includes a truck bed 117 having a tailgate member 118, a first side wall 119*a* and a second side wall 119*b*.

A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110 and tailgate activation module 142 which is utilized to perform the methods described herein. A sensor engine 150 is operably coupled to, and adapted to be in communication with, the vehicle control unit 110. The sensor engine 150 is adapted to monitor various components of, for example, the operational equipment engine 140, tailgate member 118 and various other components.

An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of vehicle tailgate adjustment system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor 195 and drivetrain 200, and sensor engine 150.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Figure 2:
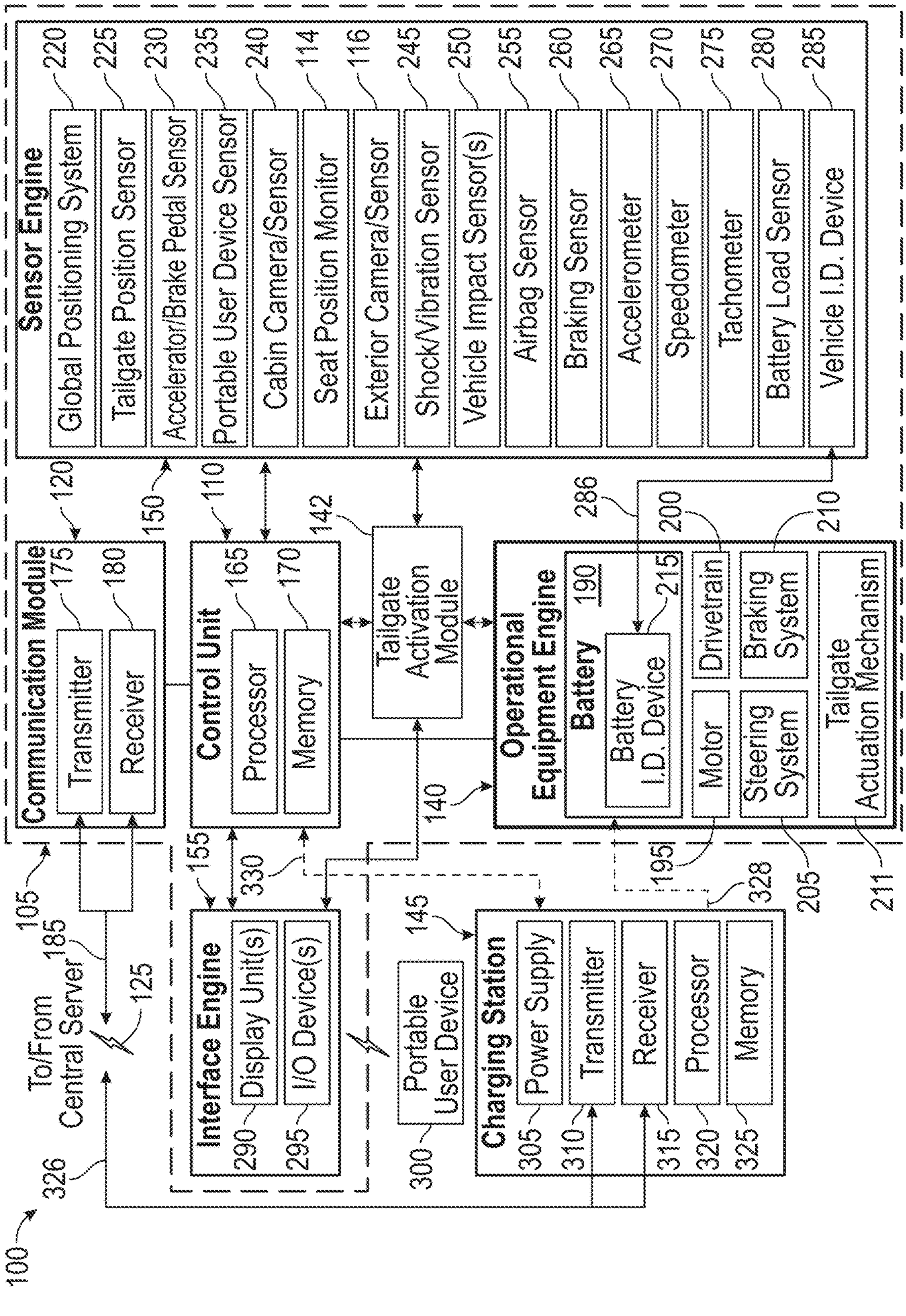
FIG. 2 is a diagrammatic illustration, in a block-diagram form, of at least a portion of the vehicle tailgate adjustment system of FIG. 1, in accordance with at least one embodiment of the present disclosure.

FIG. 2 is a diagrammatic illustration, in a block-diagram form, of at least a portion of the vehicle tailgate adjustment system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, a braking system 210, and one or more tailgate actuation mechanism(s) 211. In some vehicles, the vehicle battery 190 may provide electrical power to the motor 195 to drive the wheels 115*e* of the vehicle 105 via the drivetrain 200. In some examples, instead of or in addition to providing power to the motor 195 to drive the wheels 115*e* of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215.

The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110, includes devices such as sensors, cameras, meters, detectors, or other devices configured to measure or sense a parameter related to a driving operation of the vehicle 105 or the position (e.g., open, closed, partially open/close, height, etc.) of tailgate member 118. For example, the sensor engine 150 may include a global positioning system 220 that can be used to determine road grade, a tailgate position sensor 225 to determine the position of tailgate member 118, an accelerator/brake pedal sensor 230, a portable user device sensor 235 that can be used to determine when a certain driver or user is in the vicinity or inside vehicle 105, a cabin camera/sensor 240 used to monitor the position of persons within vehicle 105, a seat position monitor 114 used to control and monitor the position of the vehicle seats, a shock/vibration sensor 245, a vehicle impact sensor 250, an airbag sensor 255, a braking sensor 260, an accelerometer 265 (which may in some cases also serve as an inclinometer), a speedometer 270, a tachometer 275, a battery load sensor 280, a vehicle identification device 285, one or more exterior cameras or sensors 116 that can be used to monitor traffic and/or weather conditions around the vehicle or to determine when vehicle 105 approaches a parking space, or any combinations thereof. In some instances, traffic or weather patterns may be monitored from outside the vehicle and received from a server via a network.

In certain embodiments of the present disclosure, vehicle tailgate adjustment system 100 includes one or more exterior cameras/sensors 116. Such cameras 116 may be located on the rear of the vehicle near tailgate member 118, trunk or truck bed door latch. In yet other embodiments, the camera 116 may be positioned on side mirrors, any exterior wall around the truck bed, door panels, front or rear bumper, etc.

Further, the sensors or other detection devices 116 may be configured to sense or detect activity, conditions, and circumstances in an area to which the device has access, e.g., ambient conditions, conditions within the vehicle cabin, etc. Sub-components of the sensor engine 150 may be deployed at any operational area where information on the driving of the vehicle 105 may occur. Some readings from the sensor engine 150 may be fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105'*s* braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265, and may also serve as an inclinometer or tilt sensor. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105'*s* motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195'*s* working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110, tailgate activation module 142, and the functions that the vehicle control unit 110 provides. The interface engine 155 may include a display unit 290 and an input/output ("I/O") device 295 through which the user can interact with the system.

The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

As previously mentioned, in some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, key fobs, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

With further reference to FIG. 2, the vehicle tailgate adjustment system 100 also includes a tailgate activation module 142, the operation of which will be described below. In some embodiments, the tailgate activation module 142 is communicably coupled to one or more tailgate actuation mechanisms 211 (via operational equipment engine 140), and may also include its own processor and memory. Tailgate actuation mechanism 211 is the hinge/pivot/height adjusting mechanism that opens, closes, raises or lowers tailgate member 118. As described herein, the tailgate activation module 142 enables the automatic activation of the tailgate member 118 once a user initiates an activation signal via interface engine 155, portable user device 300, or some other tailgate member activation technique (e.g., a gesture adjacent tailgate member 118 to open, close or otherwise actuate member 118), according to certain illustrative embodiments. To achieve this, the tailgate activation module 142 is in communication with one or more of the sensor engine 150, VCU 110, operational equipment engine 140, or interface engine 155.

A reader of ordinary skill in the art will understand that other components or arrangements of components may be found in a vehicle 105, and that may of the same general principles apply to electric vehicles, internal combustion vehicles, and hybrid vehicles.

Figure 3:
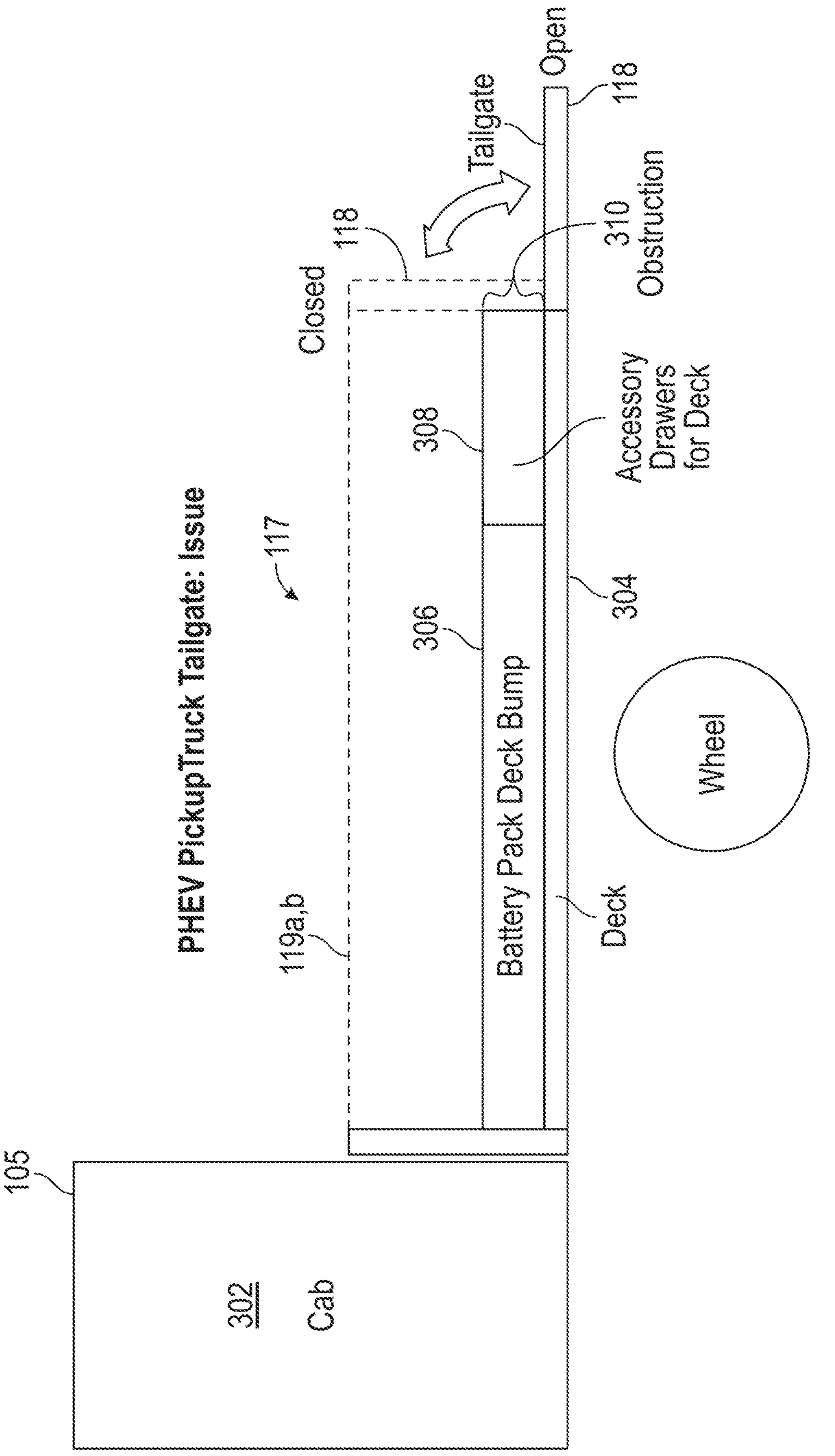
FIG. 3 is a simplified, side-view representation of the rear of a vehicle useful to explain the issue with truck bed designs lacking a height-adjustable tailgate member.

FIG. 3 is a simplified, side-view representation of the rear of vehicle 105 useful to explain the issue with truck bed designs lacking a height-adjustable tailgate member. Here, truck bed 117 is shown, along with tailgate member 118 and side walls 119*a,b*. In addition, a truck cab 302 is shown. Tailgate member 118 is shown in the horizontal, open position and the vertical, closed position. Truck bed 117 also includes a bed deck 304. Although not shown, in this embodiment a battery pack is provided under deck 304 in order to power vehicle 105. As a result of the battery pack, a deck bump 306 is created which, in-part, houses the battery pack. Deck bump 306 essentially results in deck 304 being raised 4-6 inches, in this embodiment. Further, in yet other illustrative embodiments, an accessory storage compartment 308 is positioned behind bump 306 in order to provide more storage for a user. Accessory storage compartment 308 may be a drawer design with the drawer opening facing tailgate member 118. Thus, when tailgate member 118 is in the open position as shown, a user may access accessory storage compartment 118.

An issue, however, arises when a user needs to load objects into truck bed 117. For example, if the user wants to load long objects such as 4×8 or 2×4 plywood, tailgate member 118 is too low and not level with the top of bump 306 or compartment 308, thus creating an obstruction 310 to easy onboarding. Note accessory storage compartment 308 may or may not be included in the truck bed; however, the obstruction 310 still remains.

Figure 4:
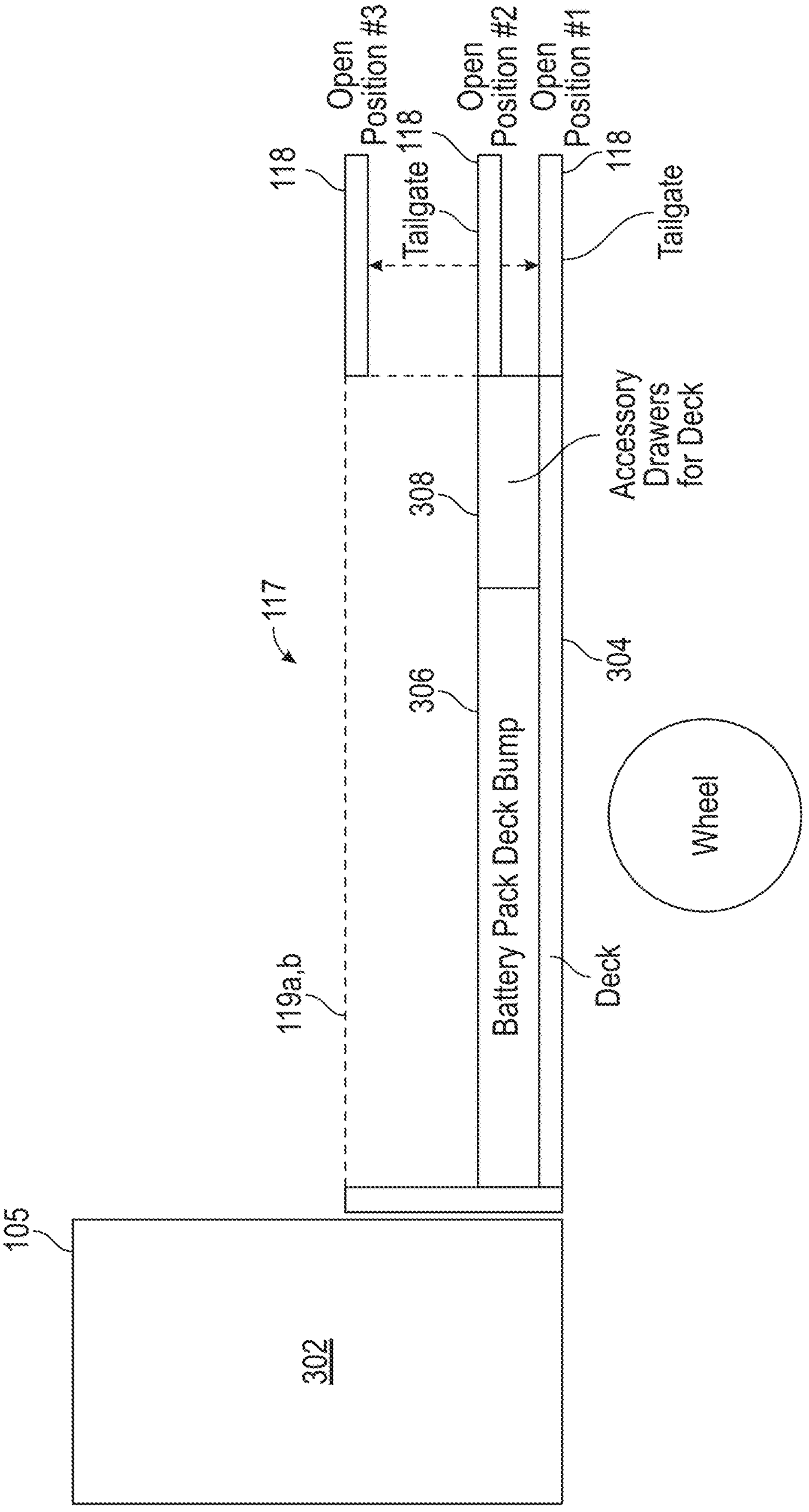
FIG. 4 is a simplified, side-view representation of the rear of a vehicle, according to certain illustrative embodiments of the present disclosure.

In view of this issue, FIG. 4 is a simplified, side-view representation of the rear of vehicle 105, according to certain illustrative embodiments of the present disclosure. Here, tailgate member 118 is shown in two programmed height positions relative to bed deck 304. In Position #1, tailgate member 118 is shown in a bottom position. In Position #2, tailgate member 118 is shown in a higher position level (i.e., intermediate position) with the top surface of accessory storage compartment 308 and deck bump 306. As a result, objects such as plywood may now be loaded into truck bed 117 in an easy, smooth and efficient manner since the bed is now level across deck bump 306, compartment 308 and tailgate member 118.

In alternative embodiments, tailgate member 118 may be raised to the uppermost Position #3 (i.e., top position) of side walls 119*a,b*. Further, the height of tailgate member 118 may be raised or lowered to any intermediate position along the along side walls 119*a,b*. The various intermediate positions may at times be useful to a user.

Figure 5:
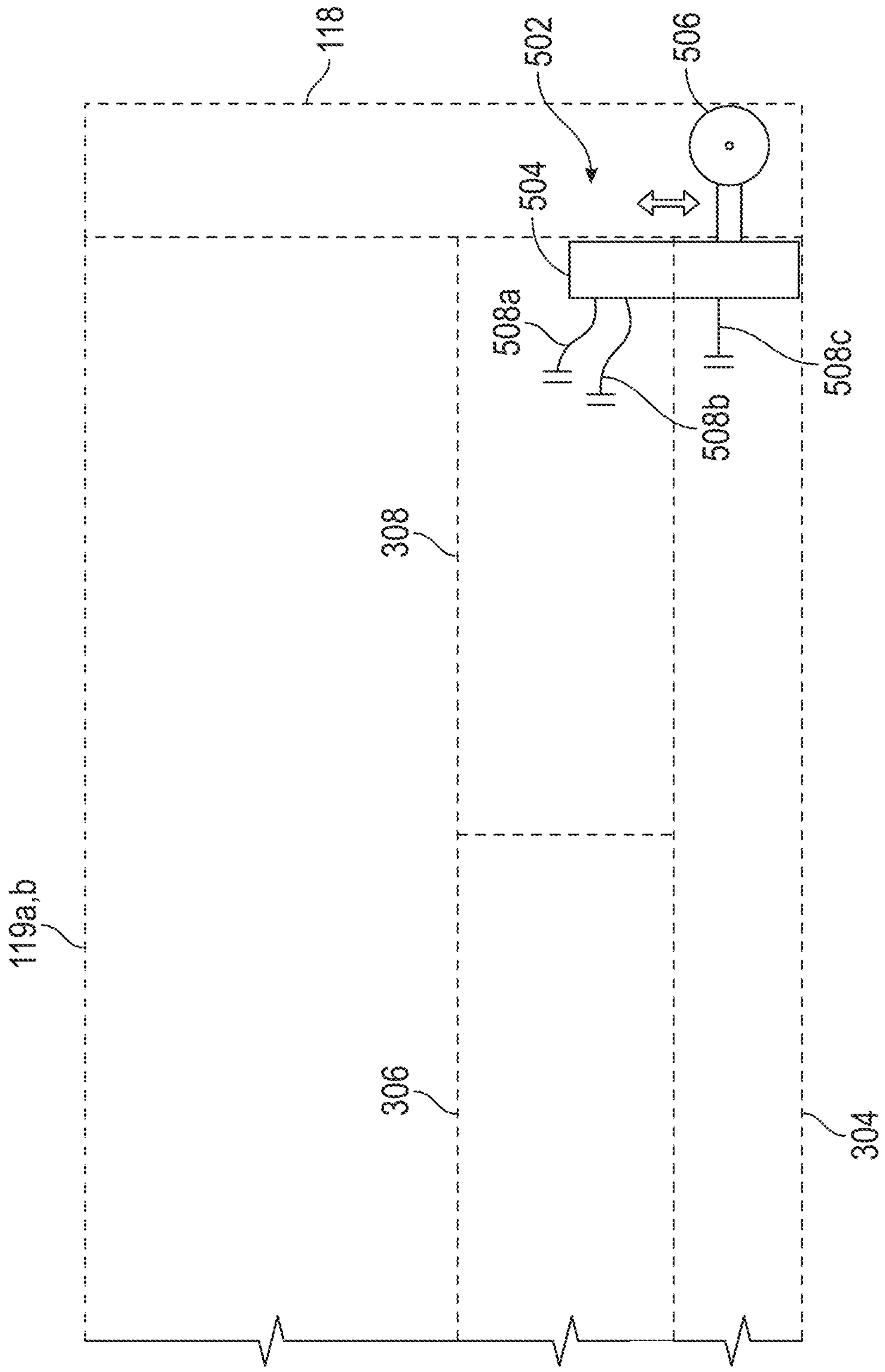
FIG. 5 illustrates an actuation mechanism used to pivot and height-adjust a tailgate member, according to certain illustrative embodiments of the present disclosure.

FIG. 5 illustrates an actuation mechanism used to pivot and height-adjust a tailgate member, according to certain illustrative embodiments of the present disclosure. Here, actuation mechanism 502 is a hydraulic mechanism including a hydraulic cylinder 504 coupled to tailgate pivot 506 which pivots tailgate 118 between the open and closed positions. In this example, cylinder 504 is communicably coupled to a hydraulic pump (not shown) via conduit 508*a*. Using a second conduit 508*b*, the hydraulic pump is also communicably coupled to another tailgate pivot and cylinder on the other side of tailgate 118.

During operation of actuation mechanism 502, an activation signal is sent from a processor to the hydraulic pump to provide pressure to cylinder 504 via conduit 508*a*. In addition, electrical power is provided to cylinder 504 via a wire 508*c*. In response, cylinder 504 moves tailgate 118 up or down according to the activation signal, which may be initiated via some button, switch or other initiation mechanism to move tailgate 118 between Positions #1, #2, #3 or intermediate positions therebetween. In certain other embodiments, tailgate pivot 506 may also be automated to electrically pivot tailgate 118 between the open and closed positions.

Other examples of hydraulic-type actuation mechanisms may include, for example, automotive two-post lift type systems or aircraft wing flap systems.

Yet other examples of actuation designs may include an electro-mechanical design such as a rotary or linear actuator that translates tailgate 118 up or down. Similar actuation mechanisms can be seen on aircraft wing control surfaces such as the elevator or aileron or window regulators in automobiles. Such designs may utilize electric motors coupled to the pivot mechanisms (on both sides of the tailgate) and the tailgate. The electric motor would spin a worm gear inside which in turn moves the tailgate up or down.

In yet other examples, an internal mechanical structure such as a 4-bar linkage may be coupled to an actuation mechanism and the tailgate in order to move it up or down.

Those ordinarily skilled in the art having the benefit of this disclosure will understand a variety of actuation designs may be used.

Alternatively, the height of tailgate member 118 may be adjusted manually. Such designs would include some mechanism to stabilize/support tailgate 118 once moved to Positions #1, #2, #3 or the intermediate positions. One exemplary design would be to use an embedded spring-assisted cable coupled to the tailgate with locking tabs at set positions and a latch to "reset" the tailgate position. The spring-assistance is provided to reduce the weight of the tailgate on the user during manual movement. An alternate exemplary embodiment may use a pulley design for added mechanical advantage, such as fitness-related designs used in deadlift Smith machines or weight-assisted dip machines. Those ordinarily skilled in the art having the benefit of this disclosure will realize a variety of designs can be employed for these purposes.

Figure 6:
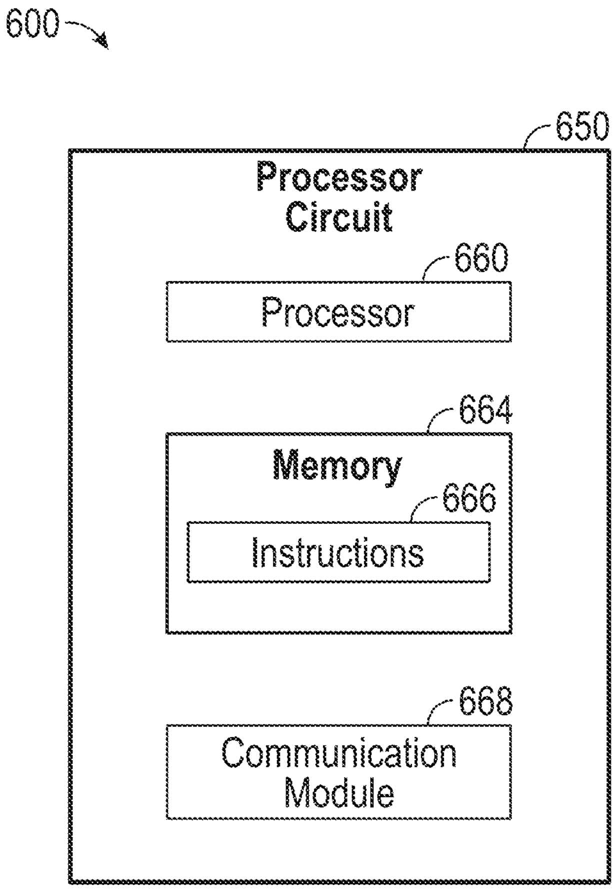
FIG. 6 is a schematic diagram of a processor circuit used to provide an actuation activation signal, in accordance with at least one embodiment of the present disclosure.

FIG. 6 is a schematic diagram of a processor circuit 650 used to provide an actuation activation signal, in accordance with at least one embodiment of the present disclosure. The processor circuit 650 may be implemented in the system 100, or other devices or workstations (e.g., third-party workstations, network routers, etc.), or on a cloud processor or other remote processing unit, as necessary to implement the methods described herein. As shown, the processor circuit 650 may include a processor 660, a memory 664 having instructions 666 thereon, and a communication module 668. These elements may be in direct or indirect communication with each other, for example via one or more buses.

The processor 660 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 660 may also comprise another hardware device, a firmware device, or any combination thereof configured to perform the operations described herein. The processor 660 may also be implemented as a combination of computing devices, e.g., a combination of a DSP and a microprocessor, a plurality of microprocessors, one or more microprocessors in conjunction with a DSP core, or any other such configuration.

The memory 664 may include a cache memory (e.g., a cache memory of the processor 660), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 664 includes a non-transitory computer-readable medium. The memory 664 may store instructions 666. The instructions 666 may include instructions that, when executed by the processor 560, cause the processor 660 to perform the operations described herein. Instructions 666 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 568 can include any electronic circuitry and/or logic circuitry to facilitate direct or indirect communication of data between the processor circuit 650, and other processors or devices. In that regard, the communication module 668 can be an input/output (I/O) device. In some instances, the communication module 668 facilitates direct or indirect communication between various elements of the processor circuit 650 and/or the system 100. The communication module 668 may communicate within the processor circuit 650 through numerous methods or protocols. Serial communication protocols may include but are not limited to United States Serial Protocol Interface (US SPI), Inter-Integrated Circuit ($I^2C$), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or readings from vehicle or environmental sensors) may be accomplished using any suitable wireless or wired communication technology, such as a cable interface such as a universal serial bus (USB), micro USB, Lightning, or Fire Wire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

The technology described herein may be implemented on manually controlled vehicles or driver-assist vehicles. The technology may be implemented in diverse combinations of hardware, software, and firmware, depending on the implementation or as necessitated by the structures and modules already present in existing vehicles. The system may be employed on vehicles with automatic transmission, manual transmissions, or vehicles with simulated shifting, including continuously variable transmission (CVT), infinitely variable transmission (IVT), hybrid transmissions (e.g., a hybrid vehicle with 4-speed automatic transmission simulating 10 gears), and fully electric vehicles.

Accordingly, the logical operations making up the embodiments of the technology described herein may be referred to variously as operations, steps, blocks, objects, elements, components, or modules. Furthermore, it should be understood that these may occur or be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the cargo seat adjustment system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the vehicle door activating system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims. Please amend the claims to read as follows:

What is claimed is:

1. A vehicle, comprising:

a bed for transporting cargo;

a tailgate member; and an actuation mechanism coupling the tailgate member to the bed, the actuation mechanism being operable to:

pivot the tailgate member between a vertical, closed position and a horizontal, open position; and adjust a height of the tailgate member relative to the bed, wherein:

the bed comprises a deck on which to place the cargo;

an accessory storage compartment is positioned on the deck adjacent to the tailgate member, the accessory storage compartment having a top surface forming a first part of a load-bearing surface of the bed and an access opening facing the tailgate member;

a battery pack housing is positioned on the deck behind the accessory storage compartment, the battery pack housing having a top surface forming a second part of the load-bearing surface of the bed; and in response to an activation signal received by processing circuitry communicably coupled to the actuation mechanism, the actuation mechanism automatically adjusts the height of the tailgate member, while in the horizontal, open position, to be level with the top surface of the accessory storage compartment.

2. The vehicle as defined in claim 1, wherein:

the bed comprises:

two side walls attached to the bed; and the actuation mechanism is operable to adjust the height of the tailgate member between a top position, intermediate position or bottom position of the side walls.

3. The vehicle as defined in claim 1, wherein, in response to the activation signal received by processing circuitry, the actuation mechanism automatically adjusts the height of the tailgate to a pre-programmed height.

4. The vehicle as defined in claim 1, wherein the actuation mechanism is operable to adjust the height of the tailgate manually.

5. The vehicle as defined in claim 1, wherein the vehicle is an electric vehicle.

6. The vehicle as defined in claim 1, wherein the automatic adjustment of the tailgate member is performed in response to a gesture of a user positioned adjacent the tailgate member.

7. A height-adjustable tailgate for vehicles, comprising:

a tailgate member;

an actuation mechanism coupling the tailgate member to a vehicle bed for transporting cargo, the actuation mechanism being operable to:

pivot the tailgate member between a vertical, closed position and a horizontal, open position; and adjust a height of the tailgate member relative to the vehicle bed, wherein:

the vehicle bed comprises:

a deck on which to place the cargo; and an accessory storage compartment positioned on the deck adjacent to the tailgate member, the accessory storage compartment having a top surface forming a first part of a load-bearing surface of the bed and an access opening facing the tailgate member;

a battery pack housing positioned on the deck behind the accessory storage compartment, the battery pack housing having a top surface forming a second part of the load-bearing surface of the bed; and in response to an activation signal received by processing circuitry communicably coupled to the actuation mechanism, the actuation mechanism automatically adjusts the height of the tailgate member, while in the horizontal, open position, to be level with a top surface of the accessory storage compartment.

8. The tailgate as defined in claim 7, wherein the actuation mechanism is operable to adjust the height of the tailgate manually.

9. The tailgate as defined in claim 7, wherein:

the vehicle bed comprises:

two side walls attached to the bed; and the actuation mechanism is operable to adjust the height of the tailgate member between a top position, intermediate position or bottom position of the side walls.

10. The tailgate as defined in claim 7, wherein the tailgate forms part of an electric vehicle.

* * * * *